United States Patent [19]

Wagner et al.

[11] 4,031,999
[45] June 28, 1977

[54] APPARATUS FOR AND METHOD OF ACCUMULATING AND THEREAFTER RELEASING, EN MASSE, A PRE-DETERMINED NUMBER OF INDIVIDUAL, ELONGATED, CYLINDRICAL ARTICLES

[75] Inventors: Roland W. Wagner; William K. Switzer, both of Cincinnati, Ohio

[73] Assignee: Warrick Equipment Corporation, Cincinnati, Ohio

[22] Filed: Jan. 23, 1976

[21] Appl. No.: 651,718

[52] U.S. Cl. .................................. 198/418; 53/61; 198/502; 198/532; 198/560; 214/1 B; 214/6 D; 214/152

[51] Int. Cl.[2] ........................................ B65G 47/44

[58] Field of Search ............ 214/6 T, 6 S, 1 P, 6 H, 214/6 D, 6 R, 1 R, 1 B, 2, 152; 198/367, 418, 502, 530, 531, 532, 560; 221/116, 131; 53/61

[56] References Cited

UNITED STATES PATENTS

| | | | |
|---|---|---|---|
| 1,325,602 | 12/1919 | Albright | 198/367 X |
| 3,535,847 | 10/1970 | Strohmeier et al. | 198/367 X |
| 3,890,764 | 6/1975 | Hartman | 53/61 |

*Primary Examiner*—Frank E. Werner
*Attorney, Agent, or Firm*—J. Warren Kinney, Jr.

[57] ABSTRACT

A plurality of elongate, cylindrical articles are continuously, sequentially advanced toward and selectively introduced into the upper and lower compartments of one or the other of a pair of article-receptive chambers. A first finite number of articles are received and accumulated in the upper compartment of one chamber and then discharged and deposited, en masse, in the lower compartment of this chamber, during which a second finite number of articles are received by the lower chamber and are accumulated with the first finite number of articles deposited therein. All of the articles accumulated in the lower compartment of this chamber are then discharged, en masse, into a suitable receptacle. While the articles are being discharged from this chamber, advancing articles are automatically directed toward and likewise introduced into the upper and thereafter the lower compartments of the other chamber.

22 Claims, 8 Drawing Figures

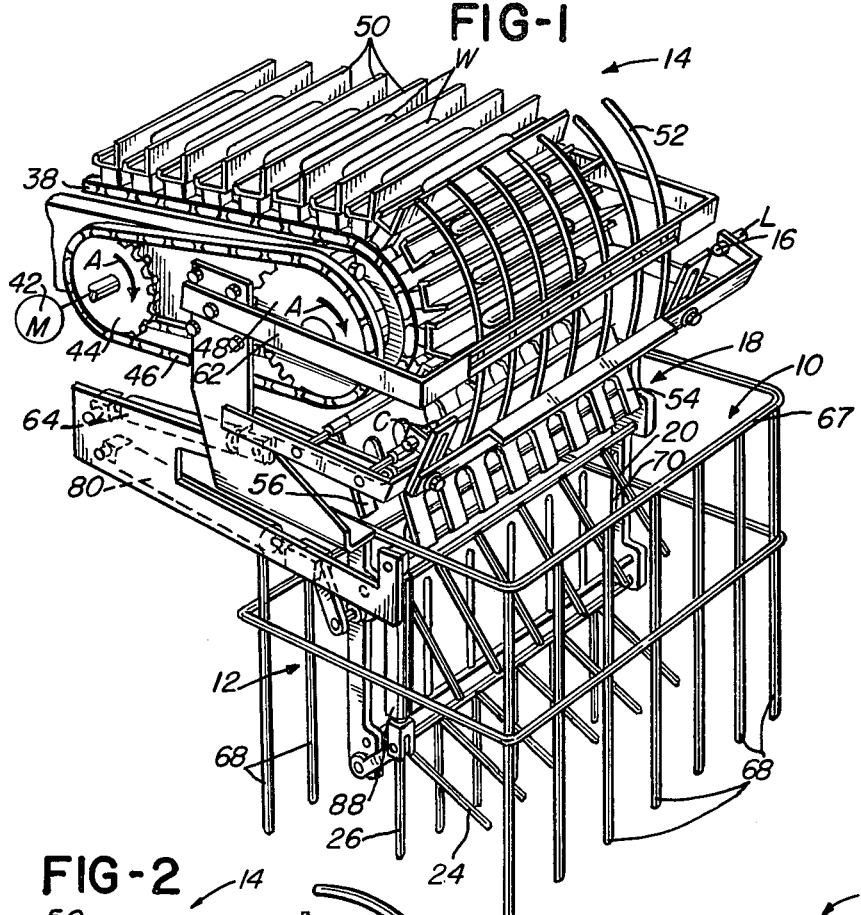

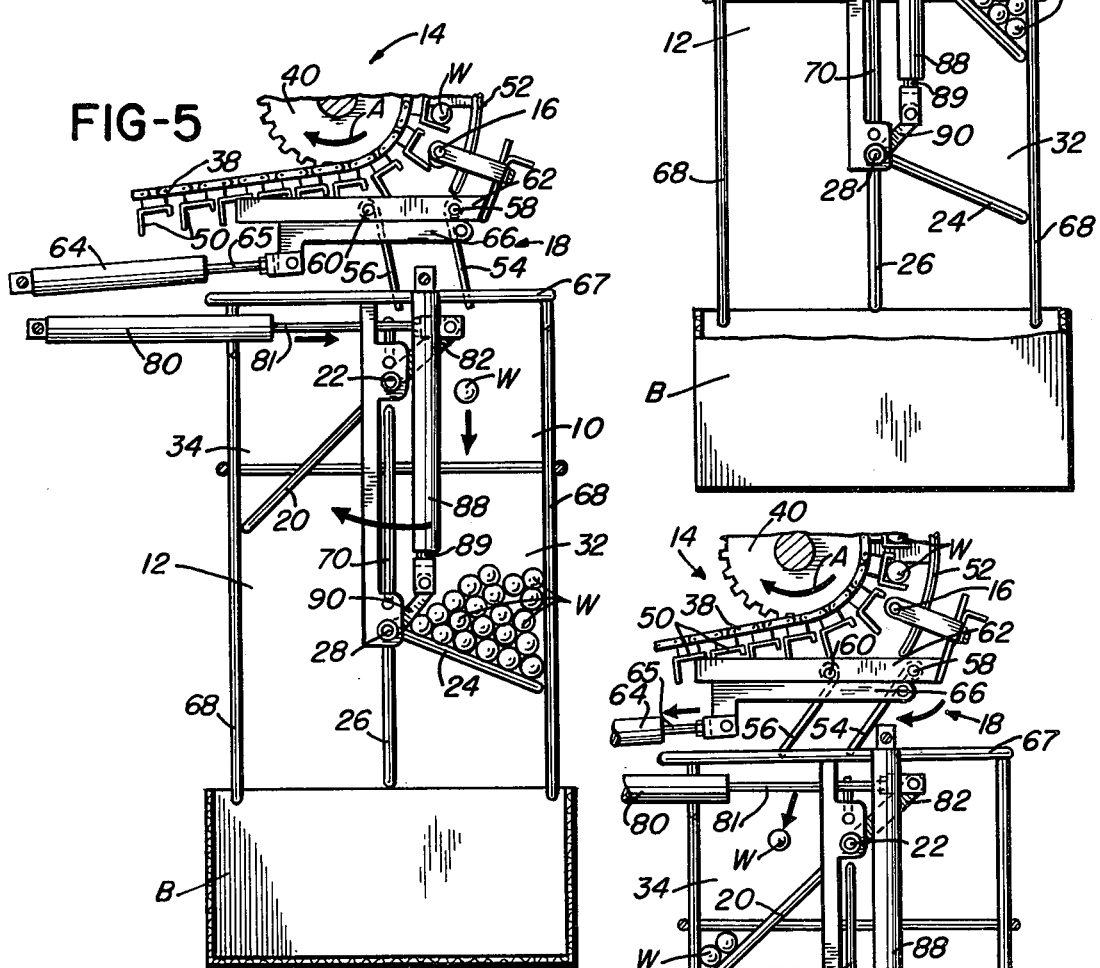

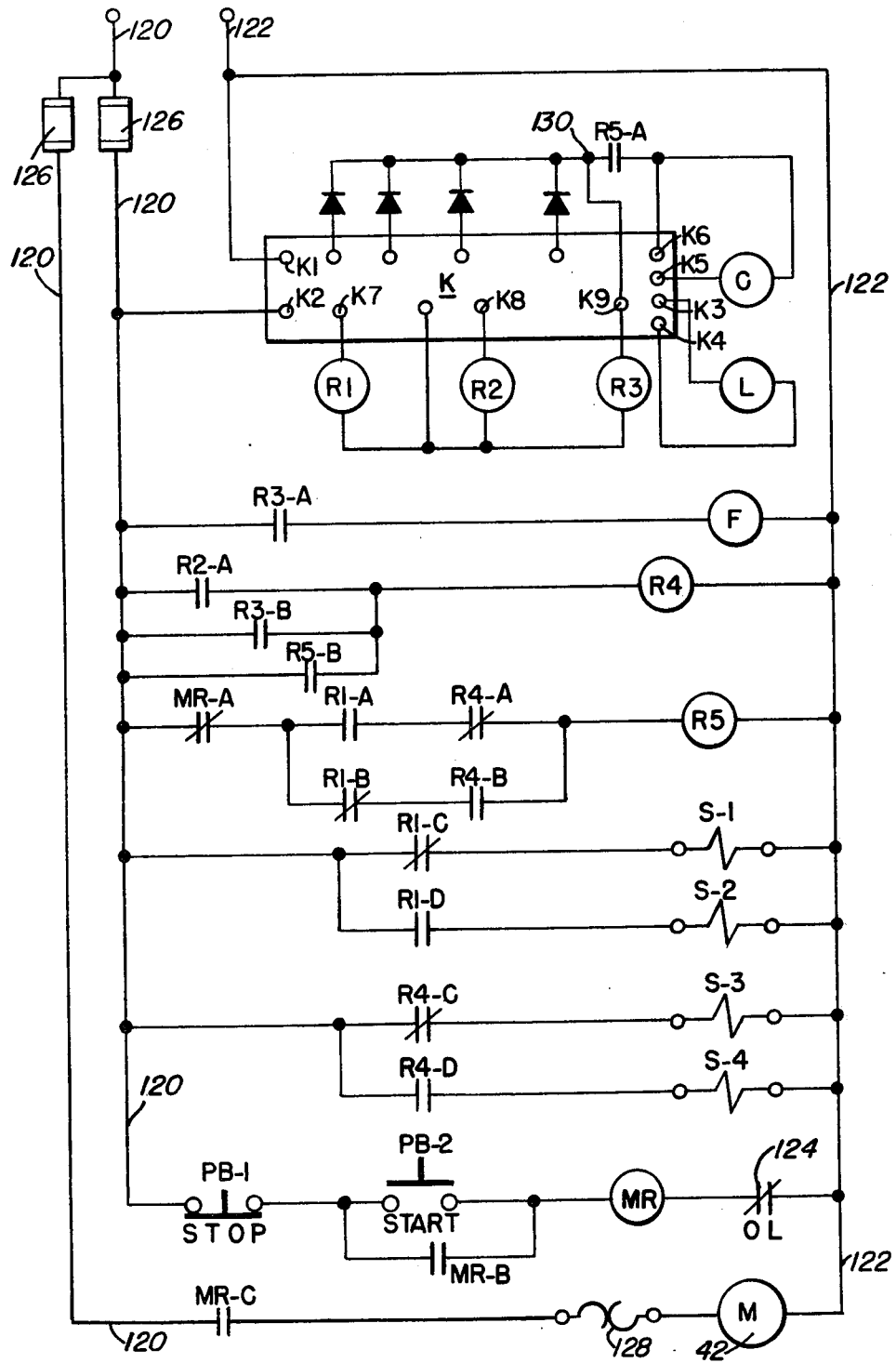

APPARATUS FOR AND METHOD OF ACCUMULATING AND THEREAFTER RELEASING, EN MASSE, A PRE-DETERMINED NUMBER OF INDIVIDUAL, ELONGATED, CYLINDRICAL ARTICLES

BACKGROUND OF THE INVENTION

1. Field of the Invention

The present invention is directed to means for and a method of bulk loading elongate, cylindrical articles such as, by way of example, wieners or the like in a suitable receptacle, wherein the articles are first accumulated in finite quantities and then discharged, en masse, into the receptacle.

2. Description of the Prior Art

Applicant is aware of bulk loaders of the type in which a plurality of similar, elongate articles such as, by way of example, wieners are continuously advanced to a discharge station and directly deposited, one-at-a-time, in a receptacle into which a finite number of such articles are accumulated. When the desired number of articles have been deposited in the receptacle, an article-restraining gate is actuated to move from an opened to a closed position for precluding discharge of the articles from the station for a certain, predetermined length of time, during which the filled receptacle is removed and an empty receptacle is placed in article-receiving position. While the article-restraining gate is in closed position the articles which would otherwise be discharged from the station and deposited, one-at-a-time, into the receptacle are, in a sense, accumulated. Once an empty receptacle has been properly positioned to replace a filled receptacle, the article-restraining gate is actuated and moved from closed to opened position, and the articles accumulated at the station are discharged, en masse, into the receptacle, after which additional articles are discharged, one-at-a-time, until the required number of articles have been deposited in the receptacle.

SUMMARY OF THE INVENTION

The bulk loader of the subject invention does not deposit a finite number of articles, one-at-a-time, into a suitable container or receptacle but, to the contrary, deposits a finite number of articles, en masse, into the container. A plurality of elongate articles are continuously, sequentially, advanced past a counting mechanism and are selectively directed toward and discharged into the upper and lower compartments of first one and then the other of a pair of article-receptive chambers. After a finite number of articles have been accumulated in one chamber, the articles are discharged, en masse, into the container. While the articles accumulated in one chamber are being discharged into the container, the articles being continuously advanced past the counting mechanism are automatically directed toward and discharged into the upper and lower compartments of the other chamber.

It is an object of the invention to provide means for and a method of bulk loading a finite number of elongate articles, en masse, into a suitable container or receptacle.

It is also an object of the invention to provide a bulk loader wherein a plurality of similar articles are continuously, sequentially advanced toward and selectively discharged into one or the other of a pair of article-receptive chambers, wherein a finite number of articles accumulated in one chamber are discharged, en masse, into a suitable receptacle while a finite number of articles are likewise accumulated in the other chamber.

Other objects and features of the invention will be readily apparent from the accompanying drawings and description of the preferred embodiment.

BRIEF DESCRIPTION OF THE DRAWINGS

FIG. 1 is a perspective view of a bulk loader which incorporates the teachings of the present invention.

FIG. 2 is a side elevation of the bulk loader of FIG. 1.

FIG. 3 is a front elevation of the bulk loader of FIG. 1.

FIG. 4 is a view similar to FIG. 2 and illustrates the upper and lower gates in closed, article-supporting relationship with the forwardly disposed chamber.

FIG. 5 is a very similar to FIG. 2 and illustrates the upper gate in closed, aricle-supporting relationship with the rearwardly disposed chamber and the lower gate in closed, article-supporting relationship with the forwardly disposed chamber, respectively.

FIG. 6 is a very similar to FIG. 2 and illustrates the upper and lower gates in closed, article-supporting relationship with the rearwardly disposed chamber.

FIG. 8 is a diagramatic illustration of the electrical portion of the exemplary electro-hydraulic circuit.

DESCRIPTION OF THE PREFERRED EMBODIMENT

Figure 7:
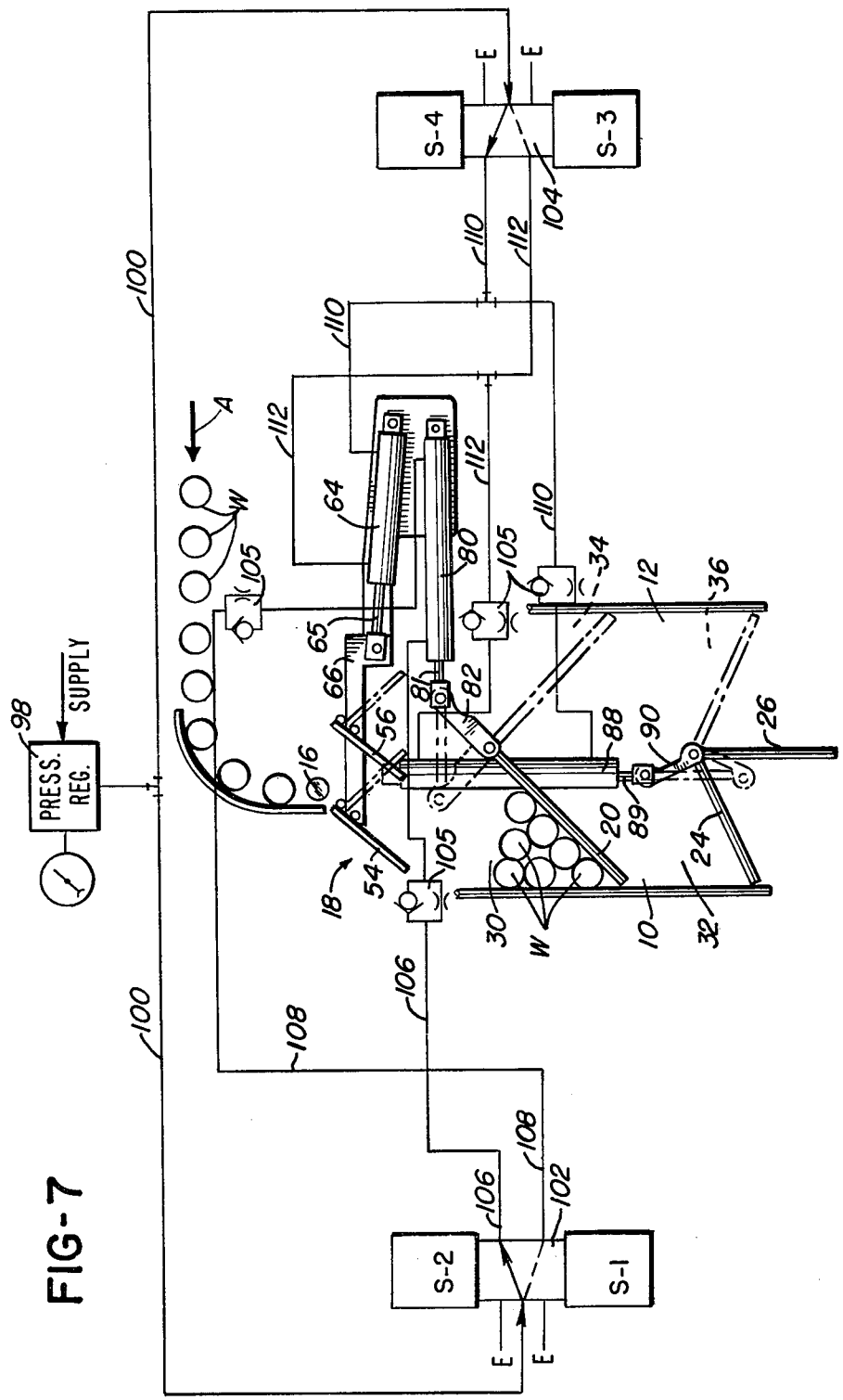
FIG. 7 is a diagramatic illustration of the hydraulic portion of an exemplary electro-hydraulic circuit for controlling the operation of the bulk loader of FIG. 1.

The bulk loader comprises, in general, a pair of article-receptive chambers 10, 12 (FIG. 2); endless conveyor 14 or the like for continuously sequentially advancing a plurality of similar elongate, cylindrical articles such as, by way of example, wieners W past an article detector 16 and for introducing the articles into a diverter 18 which selectively directs and discharges the articles, one-at-a-time, into one of the other of the chambers.

Upper gate 20 is mounted at 22 intermediate of the chambers 10, 12 and is movable between closed, article-supporting positions and open, article-releasing positions relative thereto for defining an upper, article-receptive compartment when disposed in closed position in a chamber. A lower gate comprising legs 24, 26 is mounted at 28 intermediate of chambers 10, 12 and is movable between closed, article-supporting and opened, article-releasing positions relative to the chambers for defining a lower article-receptive compartment when disposed in closed position in a chamber.

The positions of the diverter, the upper gate and the lower gate are controlled by control means such as, by way of example, the electro-hydraulic circuit diagramatically illustrated in FIGS. 7 and 8. The control means are responsive to the number of articles advanced past and detected by detector 16.

When upper gate 20 is in the closed position in forward chamber 10 and defines upper compartment 30 therein, it is in the opened position in rearward chamber 12. Conversely, when the upper gate is in the open position in forward chamber 10, it is in the closed position in rearward chamber 12 and defines upper compartment 34 therein (FIG. 5).

When leg 24 of the lower gate is in closed position in chamber 10 it defines lower compartment 32 (FIGS. 2, 4 and 5) therein, whereas leg 26 is simultaneously in opened position relative to rearward chamber 12. Conversely, when leg 24 of the lower gate is shifted to open position, leg 26 is shifted to closed position in chamber 12 and defines lower compartment 36 therein (FIG. 6).

Diverter 18 is movable between a first position (FIGS. 2, 4 and 5) for directing articles into the forward chamber 10 and a second position (FIG. 6) for directing articles into the rearward chamber 12. The diverter is shifted from first to second position when leg 24 is shifted from closed to opened position, and conversely, is shifted from second to first position when leg 26 is shifted from closed to opened position. Thus articles W are always introduced into a chamber wherein the lower gate is in closed position. In the present example, upper gate 20 is always moved to a closed position in a chamber prior to movement of the lower gate to closed position therein. Therefore, diverter 18 always directs articles into a chamber wherein the upper gate, as well as the lower gate, is initially in closed position.

For ease of understanding, it will be assumed throughout this description that, initially, diverter 18 is positioned to direct articles W into forward chamber 10, and that upper gate 20 is in closed position in chamber 10 to define upper compartment 30 therein, and leg 24 of the lower gate is in closed position in chamber 10 to define lower compartment 32 therein (see FIG. 4).

As articles are advanced toward detector 16 by conveyor 14, they are counted, and introduced into diverter 18 by which the are directed to and discharged in upper compartment 30. After a predetermined number of articles W have been accumulated in compartment 30, upper gate 20 is actuated by the control means to move to open, article-releasing position relative to the forward chamber 10, and the articles accumulated in the upper compartment 30 are discharged, en masse, and deposited in the lower compartment 32 (FIG. 5). Thereafter advancing articles are deposited directly into compartment 32. After an additional predetermined number of articles have been accumulated in lower compartment 32, the lower gate is actuated to move leg 24 to opened, article-releasing position relative to the forward chamber, whereby the accumulated articles are discharged, en masse, into a suitable container or receptacle such as box B (FIG. 6).

As leg 24 is actuated to opened position and the articles accumulated in lower compartment 32 are discharged, diverter 18 is actuated to move from the first to the second position and thereafter directs the advancing articles into upper compartment 34 of rearward chamber 12. As is the procedure with respect to chamber 10, a predetermined number of articles are accumulated in upper compartment 34 of rearward chamber 12, after which gate 20 is opened and the articles are discharged, en masse, into lower compartment 36, where the articles are accumulated with an additional predetermined number of advancing articles and are discharged, en masse, into box B.

THE CONVEYOR

The conveyor, per se, does not form part of the present invention and it should, of course, be understood that any means adapted to continuously, sequentially advancing a plurality of elongate, cylindrical articles in parallel, axially aligned relationship, toward a discharge station could be substituted therefor. Conveyor 14 includes a pair of spaced apart, parallel, endless, flexible member such as, by way of example, chains 38 which are carried by sprockets 40 or the like. The conveyor is advanced in the direction of arrows A (FIG. 1) by drive means comprising motor 42, drive sprocket 44, drive chain 46 and follower sprocket 48, which is in driving relationship with sprocket 40.

A plurality of individual compartments 50 are secured to, carried by and movable with chains 38. Each compartment is adapted for carrying an individual elongate article, whereby the articles are disposed in parallel, axially aligned relationship as they are advanced by conveyor 14 past detector 16 and to diverter 18.

Curvilinear guard 52 is secured forwardly of the downward portion of the conveyor path and maintains the articles within compartments 50 as they enter the downward portion of their travel. The articles fall from compartments 50 and into diverter 18, one-at-a-time, in parallel aligned relationship as each compartment enters the rearward portion of its travel.

THE DIVERTER

Diverter 18 is disposed in communication with conveyor 14 for receiving articles W as they fall from compartments 50. The diverter comprises a pair of laterally spaced, substantially parallel plates or guides 54, 56 which are movable in unison between a forward position (FIGS. 2, 4 and 5) in communication with the forwardly disposed chamber 10, and a rearward position (FIG. 6) in communication with the rearwardly disposed chamber 12. The upper ends of plates 54, 56 are pivotally mounted at 58, 60, respectively, to an elongate support 62 which is mounted in fixed relationship with the conveyor 14 and chambers 10, 12.

Diverter actuator means such as, by way of example, the piston rod 65 of cylinder 64 is secured to elongate actuator arm 66 which is mounted for reciprocating movement parallel to support 62. The intermediate portions of the diverter plates 54, 56, are connected to arm 66 for movement between a forward position, when the piston rod is extended rod is extended, and a rearward position, when the piston rod is retracted. The diverter actuator means is responsive to the control circuitry of FIGS. 7 and 8, which, in turn, is responsive to the number of articles advanced past and counted by detector 16.

THE ARTICLE-RECEPTIVE CHAMBERS

Chambers 10 and 12 are defined by an outer substantially open, rectangular framework 67 having substantially vertical outer walls defined by a plurality of parallel, spaced apart, elongate members 68, as shown in FIG. 1. The open construction permits observation of and easy access to the interior of the chambers for cleaning and maintenance. The open upper and lower ends of the framework readily accomodate articles A as they are discharged from the diverter, one-at-a-time, in parallel, horizontal, axially aligned relationship.

A substantially vertical center divider 70 is disposed intermediate of and in substantial parallelism with the outer walls for sub-dividing the framework into a pair of vertical, open-ended, side-by-side sections which define the forwardly and rearwardly disposed chambers 10 and 12. Divider 70 includes an elongate, horizontal support 72 mounted in fixed relationship with framework 67. A plurality of elongate, upstanding, spaced apart, parallel members 76 project vertically from support 72 and define the separate chambers. Members 74 preclude passage of articles W between chambers 10 and 12 but readily permit movement of upper gate 20 between its various opened and closed positions relative to the chambers. Chambers 10 and 12 maintain the articles in parallel, axially aligned relationship as they are accumulated in the upper and lower compartments defined by the upper and lower gates.

THE UPPER GATE

Upper gate 20 is pivotally mounted at 22 in vertical alignment with center divider 70 and is movable between closed and opened positions in chambers 10 and 12. When the gate is in closed position in chamber 10 it defines the bottom wall of an upper compartment 30 therein and alternately when it is in closed position in chamber 12 it defines the bottom wall of an upper compartment 34 therein. As shown in FIGS. 4 and 6, the gate, when closed, is inclined downwardly from center-divider 70 toward side walls 68, whereby articles introduced into a chamber are stacked in compact, inclined, parallel, axially aligned, touching relationship with one another.

The gate includes an elongate horizontal support shaft 76 mounted for axial rotation above center divider 70. A plurality of elongate, spaced apart, substantially parallel members 78 project radially outward from shaft 76 and are disposed in the open spaces between the various elongate members 74 of the center divider (FIG. 3), whereby gate 20 may be readily moved through the center divider from one chamber to the other.

Upper gate actuator means such as, by way of example, the piston rod 81 of cylinder 80 is pivotally secured to an elongate actuator arm 82 which projects radially outward from shaft 76. The upper gate actuator is responsive to the control circuitry of FIGS. 7 and 8.

When piston rod 81 is in the retracted position (FIGS. 2 and 4), upper gate 20 is disposed in closed, article-supporting relationship with the forwardly disposed chamber 10. Conversely, when the piston rod is disposed in the extended position, gate 20 is in closed, article-supporting relationship with the rearwardly disposed chamber 12 (FIGS. 5 and 6).

THE LOWER GATE

The lower gate preferably comprises a pair of legs 24 and 26 which are pivotally mounted at 28 in vertical alignment with center divider 70. Leg 24 is movable between closed, article-supporting position (FIGS. 2, 4 and 5) and opened, article-releasing position (FIG. 6) with forwardly disposed chamber 10, whereas leg 26 is movable between closed, article-supporting position (FIG. 6) and opened, article-releasing position (FIGs. 2, 4 and 5) with rearwardly disposed chamber 12. When leg 24 is in closed position in chamber 10 it defines the bottom wall of a lower compartment 32 therein, whereas when leg 26 is in closed position in chamber 12 it defines the bottom wall of a lower compartment 36 therein. Each leg, when closed, is inclined downwardly from center-divider 70 toward side walls 68, whereby articles dropped, en masse, from an upper compartment are maintained in compact, touching relationship and additional articles introduced directly from the diverter into the lower compartments are stacked in axially aligned, parallel, touching relationship therewith (see FIG. 5).

Each leg of the lower gate comprises a plurality of elongate, spaced apart substantially parallel members 84 which project radially outward from an elongate, horizontal shaft 86 mounted for axial rotation beneath center divider 70. Uniformly satisfactory results have been achieved when the included angle between the legs is approximately 60°, wherein the leg disposed in closed, article-supporting relationship with its respective chamber is inclined downwardly from center divider 70 at an angle of approximately 30° and the leg disposed in opened, article-releasing relationship with its respective chamber is disposed in substantially vertical alignment with the center divider.

Lower gate actuator means such as, by way of example, the piston rod 89 of cylinder 88 is pivotally secured to an elongate actuator arm 90 which projects radially outward from shaft 86. The lower gate actuator is responsive to the control circuitry of FIGS. 7 and 8. When the piston rod is in the retracted position (FIGS. 2, 4 and 5), leg 24 is disposed in closed, article-supporting relationship, whereas when the piston rod is in the extended position (FIG. 6), leg 26 is disposed in the closed, article-supporting position.

When a lower gate is in opened position with respect to one chamber and is in vertical alignment with center divider 70 it may serve as a guide for directing articles into a container such as a collapsable bag or the like which has an opening substantially the same size as the lower open end of one chamber. One side wall of the bag is disposed outwardly of and in engagement with the depending sides 68 of the chamber, whereas the opposite side wall of the bag is engaged by the leg of the gate as it moves from closed to opened position, opening the mouth and disposing the bag in an open, article-receptive condition.

THE DETECTOR AND ASSOCIATED CONTROL CIRCUITRY

The diverter, upper gate and lower gate actuators are responsive to the electro-hydraulic control circuit illustrated in FIGS. 7 and 8. As shown in FIG. 7, fluid is supplied under pressure to supply line 100 via pressure regulator 98. The supply line is in communication with a pair of solenoid operated valves 102, 104. Valve 102 is operated by solenoids S-1 and S-2, whereas valve 104 is operated by solenoids S-3 and S-4. Where desired, fluid control valves 105 may be included in certain of the supply and return lines.

Line 106 is under pressure and line 108 is open to exhaust when solenoid S-1 is energized, whereby the piston rod actuator 81 is retracted and upper gate 20 is in closed position relative to forward chamber 10. Conversely, line 108 is under pressure and line 106 is open to exhaust when solenoid S-2 is energized, whereby the actuator 81 is advanced and upper gate 20 is in closed position relative to rearward chamber 12.

Line 110 is under pressure and line 112 is open to exhaust when solenoid S-3 is energized. Thus, when solenoid S-3 is energized, the piston rod actuator 65 is advanced and diverter guides 54, 56 are positioned to direct advancing articles W into forward chamber 10. Also, the piston rod actuator 89 is retracted and leg 24 of the lower gate is disposed in closed position relative to forward chamber 10. Conversely, line 112 is under pressure and line 110 is open to exhaust when solenoid S-4 is energized. In this case, actuator 65 is retracted and guides 54, 56 of the diverter are disposed in position for directing advancing articles W into rearward chamber 12, whereas actuator 89 is advanced and leg 26 of the lower gate is disposed in a closed position relative to rearward chamber 12.

As illustrated in FIG. 8, solenoids S-1, S-2, S-3 and S-4 are selectively electrically energized by a series of counters included in the counter chassis K, wherein the counters produce a plurality of independent, distinct output signals in response to the number of articles advanced past and detected by detector 16.

In the preferred embodiment, detector 16 comprises an illuminated source L and a light-sensitive or photosensitive cell C disposed at opposite sides of conveyor 14, whereby advancing articles W break the light beam between the source and the cell for producing an output signal indicating the presence of an article in a compartment 50 of the conveyor. It should, of course, be understood that other detectors could be utilized without departing from the scope and spirit of the invention. However, the photo-sensitive cell has certain advantages over other detectors in that it detects the presence of the articles, per se, whereby the counters respond to actual article count. That is, one or more empty compartments 50 will not present any difficulty or inconsistency in the operation of the loader.

Power is provided to counter chassis K via power lines 120, 122 at chassis terminals K1, K2. Source L is connected to the chassis at terminals K3, K4 and is illuminated whenever the power is ON. Cell C is connected to chassis terminals K5, K6 and also is energized whenever the power is ON. However, an electrical signal is present at terminal K6 only when the light beam from source L to cell C is broken by the presence of an article in a compartment 50. Thus, each time an article passes between source L and cell C, a momentary output signal or pulse is provided at terminal K6 of the counter chassis K.

The counter chassis includes three separate, independent counter circuits, each of which is set to respond to a distinct, predetermined number of pulses produced by cell C. The three counter circuits are independently energized when the respective predetermined number of pulses has been entered at terminal K6, wherein the first counter produces an output signal at terminal K7 for energizing relay R1; the second counter circuit produces an output signal at terminal K8 for energizing relay R2; and the third counter circuit produces an output signal at terminal K9 for energizing relay R3. The contacts of relays R1, R2 and R3 comprise the control elements for energizing and de-energizing solenoids S-1, S-2, S-3 and S-4, as will be fully developed herein.

When the power is ON, "start" push button PB-2 is depressed to momentarily close and energize the circuit to motor relay control MR. Once control MR is energized, normally open contacts MR-B are closed and the control remains energized after push button PB-2 is released and until the circuit is opened by depressing "stop" push button PB-1 or until normally closed safety contacts 124 such as, by way of example, motor circuit overload contacts OL are opened. Normally open contacts MR-C are closed and motor 42 is energized, whereby the conveyor is advanced in the direction of arrows A (FIG. 1) and articles are advanced past detector 16. It should, of course, be understood that fuses 126 and circuit breakers 128, or the like, are included to enhance the safety of the control circuit.

In order to more easily understood the operation of the various counters it will be assumed that 54 articles are to be deposited in each box B, wherein 15 articles are deposited directly into each of compartments 30, 32 and 34, and nine articles are deposited directly into compartment 36.

Initially, there is no output present at terminals K7, K8 and K9, and relays R1, R2 and R3 are de-energized. Relay R1 directly controls solenoids S-1 and S-2, whereas relays R2 and R3 control solenoids S-3 and S-4 by means of relay R4.

Relays R1 and R4 are "sequence" or "memory" relays of the type having contacts which are movable between open and closed states each time the relay is energized. Each time relay R1 or R4 is energized the contacts shift from one to the other state, and the contacts remain in the new state until the relay is again energized. Initially, contacts R1-C and R4-C are pre-set in the closed position for energizing solenoids S-1 and S-3, respectively, whereas contacts R1-D and R4-D are pre-set in the open state and solenoids S-2 and S-4 are de-energized. Thus, lines 106 and 110 are under pressure, whereby diverter guides 54, 56 direct articles into chamber 10, and gates 20 and 24 are closed relative to chamber 10.

Relays R2, R3 and R5 are of the type having "biased" contacts, wherein the contacts are normally disposed in one of two possible states. The contacts are operable to move to the other state only when the relay is energized, and return to the normal state when the relay is de-energized.

Once motor 42 is energized, articles W are advanced past detector 16, and each article breaks the light beam between source L and cell C to produce a pulse signal which is input to counter chassis K at terminal K6. As the articles are detected and counted by detector 16, they fall from conveyor 14 into diverter 18 and are directed thereby into upper compartment 30 of forward chamber 10.

The first counter circuit is set to be actuated in response to input of the fifteenth pulse at terminal K6 for producing a momentary output at terminal K7. Therefore, after 15 articles have been advanced past the detector 16 and discharged into compartment 30, relay R1 is momentarily energized and closed contact R1-C is opened to de-energize solenoid S-1, whereas open contact R1-D is closed to energize solenoid S-2. Valve 102 is shifted relative to supply line 100 and exhaust E for placing line 108 under pressure to move piston rod actuator 81 from a retracted to an advanced position and shift gate 20 from closed position in chamber 10 to closed position in chamber 12. The 15 articles deposited in upper compartment 30 are discharged, en masse, into lower compartment 32 of chamber 10.

The second counter circuit of counter chassis K is set to be actuated in response to input of the thirtieth pulse at terminal K7 for producing a momentary output at terminal K8. Thus, after thirty articles have been advanced past detector 16, the last fifteen of which have been deposited directly into lower compartment 32 of chamber 10, relay R2 is momentarily energized. Normally open contacts R2-A are closed to momentarily energize relay R4, and closed contacts R4-C are opened to de-energize solenoid S-3, whereas open contacts R4-D are closed to energize solenoid S-4. Valve 104 is shifted relative to the supply and exhaust lines for placing line 112 under pressure. Piston rod actuator 64 is moved from the advanced position to the retracted position, and guides 54, 56 of diverter 18 are disposed in communication with the upper open end of chamber 12. Piston rod actuator 89 is moved from retracted to advanced position and lower gate 24 is opened relative to chamber 10, whereas lower gate 26 is closed relative to chamber 12. The 30 articles accumulated in lower compartment 32 of chamber 10 are deposited, en masse, into container B.

The first counter circuit is set to again be actuated when the forty-fifth pulse is entered at terminal K6. Thus, after the next fifteen articles have been advanced past detector 16 and discharged directly into upper compartment 34 of chamber 12, the first counter is actuated and relay R1 is momentarily energized. The now closed contacts R1-D return to the open position and solenoid S-2 is de-energized, whereas the now open contacts R1-C return to the closed position and solenoid S-1 is energized. This shifts valve 102 relative to the supply and exhaust lines, and places line 106 under pressure, whereby piston rod actuator 81 is moved from an advanced to a retracted position and gate 20 is shifted from closed position relative to chamber 12 to closed position relative to chamber 10 for discharging the 15 articles deposited in upper compartment 34, en masse, into lower compartment 36.

Normally, the second counter circuit is set to again be actuated when the sixtieth pulse is entered at terminal K6, whereby output at terminal K8 is terminated for again momentarily energizing relay R2 and close contacts R2-A. Relay R4 would be momentarily energized to close contacts R4-C for energizing solenoid S-3, and to open contacts R4-D for de-energizing solenoid S-4. Lower gate 26 would open and discharge the accumulated articles from chamber 12, whereas lower gate 24 would close and diverter 18 would direct advancing articles into chamber 10.

However, since 54 articles are to be deposited in container B, it is necessary to open gate 26 after only nine articles have been deposited directly into lower compartment 36 of chamber 12. The third counter overrides the first and second counters and is actuated in response to the 54 pulse entered at terminal K6 to produce a momentary output at K9 for momentarily energizing relay R-3. Normally open contacts R3-B are momentarily closed to energize relay R-4. Contacts R4-C are closed to energize solenoid S-3, whereas contacts R4-D are opened to de-energize solenoid S-4, whereby valve 104 is shifted relative to the supply and exhaust lines for placing line 110 under pressure. The piston rod actuator 65 is advanced and diverter guides 54, 56 are moved into communication with the upper end of chamber 10. The piston rod actuator 89 is retracted, and gate 26 is shifted to open position relative to chamber 12, whereas gate 24 is closed relative to chamber 10. The twenty-four articles in lower compartment 36, the last nine of which have been deposited directly therein, are discharged into container B.

Normally open contacts R3-A are also closed when relay R3 is energized and means such as, by way of example, lamp F is illuminated to indicate that a final count is reached and a container is "full."

When an output is present at terminal K9, terminal 130 is also energized for resetting all three counters to their respective initial states, wherein the first counter is actuated on the 15 and 45 pulse, the second counter is actuated on the 30 and 60 pulse, and the third counter is actuated on the 54 pulse. No outputs are present at terminals K7, K8 and K9, whereby relays R1, R2 and R3 are deenergized. It will, of course, be understood that in the present example solenoids S-1 and S-3 are energized for disposing the diverter guides 54, 56 in communication with chamber 10, and the upper gate 20 and the lower gate 24 in closed position relative to chamber 10. Repetition of the cycle begins with the next pulse produced by cell C and entered at terminal K6 when the next article is advanced past detector 16.

The full container may be removed and an empty container positioned in its place while the advancing articles are being introduced into the upper compartment of chamber 10.

Relay R5 is included for resetting the counters in the event motor relay control MR is de-energized prior to completion of a cycle. Upon de-energization of control MR, normally closed contacts MR-A are de-activated and moved from an opened to a closed position. If relay R1 is energized, and relay R4 is de-energized, contacts R1-A and R4-A are closed. If relay R1 is de-energized and relay R4 is energized, contacts R1-B and R4-B are closed. In either case, relay R5 is energized to close normally open contacts R5-A, whereby the next pulse produced by cell C is entered at terminal 130 as well as terminal K6 and the counters are reset to their respective initial states.

Contacts R5-B are also closed and energize relay R-4 in the event it is not energized at the time motor relay control is de-energized. In this event, the state of contacts R4-C and R4-D are changed and lower gates 24, 26 are moved relative to their respective chambers 10, 12. This ensures that the diverter guides 54, 56 are in communication with a particular chamber, and that the upper gate 20 and the respective lower gate 24, 26 are closed relative to the same chamber, whereby the cycle is automatically restarted when motor relay control MR is energized. It should, of course, be understood that normaly closed contacts MR-A are opened as soon as motor relay control MR is energized, whereby relay R5 is de-energized and contacts R5-A and R5-B are opened.

From the foregoing, it will be understood that the first counter controls the number of articles deposited in the upper compartment of each chamber, whereas the second counter controls the number of articles directly deposited in the lower compartment of each chamber. The third counter is an accumulative counter which controls the total number of articles to be deposited in all of the chambers and discharged into a container for each cycle of operation.

It should, of course, be understood that the counters may be set to respond to any predetermined number of pulses without requiring departure from the operation disclosed herein.

While a device including a pair of side-by-side chambers has been described herein, it should be understood that where the volume of the articles to be loaded may be handled by a single chamber, the device may be so utilized without departing from the present invention. In those instances where a single chamber is used, the diverter is omitted and the sequence of operation is as follows:

When a predetermined number of articles have been accumulated in the upper compartment of the chamber, the upper gate is opened and the articles are released, en masse, into and retained in the lower compartment, where an additional predetermined number of articles are introduced and accumulated. When the lower gate is opened to release the accumulated articles, en masse, from the lower compartment into a suitable receptacle, the upper gate is simultaneously closed to retain and accumulate articles in the upper compartment. After the articles have been released from the lower compartment and before the upper gate is again opened, the lower gate is closed to define the bottom wall of the lower compartment.

The circuitry illustrated in FIGS. 7 and 8 is utilized to control the device whether a pair of chambers or a single chamber is used.

What is claimed is:

1. A device for accumulating and thereafter releasing, en masse, a predetermined number of individual, elongate, cylindrical articles, comprising:
    a pair of article-receptive chambers, each having upper and lower open ends;
    means selectively and sequentially introducing a plurality of individual, elongate articles into the upper end of one or the other of said chambers;
    an upper gate disposed intermediate the upper and lower ends of said chambers and movable between alternate closed, article-supporting and opened, article-releasing positions first in one and then in the other chamber, said gate when in closed position defining the bottom of an article-receptive upper compartment in one or the other of the chambers;
    a lower gate disposed adjacent the lower ends of said chambers and movable between alternate closed, article-supporting and opened, article-releasing positions first in one and then in the other chamber, said gate when in closed position defining the bottom of an article-receptive lower compartment in one or the other of the chambers;
    actuator means for each of said gates to move them from one to the other of their closed and opened positons; and
    control means responsive to the number of articles received in the compartments of said chambers to actuate said actuator means.

2. A device as called for in claim 1, wherein the upper gate is common to and movable between said chambers and is in closed, article-supporting position in one chamber when in opened, article-releasing position in the other chamber.

3. A device as called for in claim 1, wherein the lower gate is common to and movable between said chambers and is in closed, article-supporting position in one chamber when in opened, article-releasing position in the other chamber.

4. A device as called for in claim 1, wherein the gate defined bottom of each compartment is downwardly inclined.

5. A device as called for in claim 1, wherein the lower gate includes a pair of angularly-spaced legs, wherein one leg is disposed in a downwardly projecting, substantially vertical position intermediate said chambers when the other leg is in closed, article-supporting position.

6. A device as called for in claim 5, wherein each chamber includes an outer side wall extending downwardly beyond the lower open end of the chamber, and wherein the vertically disposed leg of said lower gate is disposed opposite of and substantially parallel to said outer wall.

7. A device as called for in claim 1, wherein the first mentioned means includes a diverter disposed above the upper ends of said chambers selectively movable between first and second positions for directing articles into one or the other of said chambers.

8. A device as called for in claim 7, wherein the control means includes:
    a first counter-controlled circuit, responsive to the number of articles introduced into the diverter and thence into the upper compartment of a chamber, to actuate the upper gate actuator means; and
    a second counter-controlled circuit, responsive to the number of articles introduced into the diverter and thence into the lower compartment of the same chamber, to actuate the lower gate actuator means.

9. A device as called for in claim 8, wherein the control means includes:
    a third counter-controlled circuit, responsive to a predetermined number of articles introduced into a diverter and thence into said chambers, to override the second counter-controlled circuit and actuate the lower gate actuator means.

10. A device as called for in claim 9, wherein the upper and lower gates are initially in closed position in the same chamber, and the diverter is disposed in position for directing articles into said chamber.

11. A device as called for in claim 10, wherein said third control circuit is operable to actuate the upper gate and/or lower gate actuator means to reset the diverter, the upper gate and the lower gate in their respective initial positions.

12. A device as called for in claim 10, wherein the control means is operable to move the diverter from one to the other of its positions each time the lower gate is moved from one to the other of its positions.

13. A device as called for in claim 9, which includes means, responsive to the introduction of an article into the diverter, to produce an electrical pulse signal, wherein each of said counter-controlled circuits is responsive to a predetermined number of pulse signals.

14. A device as called for in claim 13, wherein said means comprises a photo-sensitive cell in combination with a light source for directing a beam of light toward said cell, wherein each article breaks the beam of light between the cell and the source to actuate said cell and produce an electrical pulse signal.

15. A device as called for in claim 7, wherein:
    said first mentioned means introduces articles into said diverter in substantially parallel horizontal, axially aligned relationship with one another; and
    said gates, when closed, accumulate the articles in abutting, parallel horizontal, axially aligned, stacked relationship in the compartments of said chambers.

16. A device for accumulating and thereafter releasing, en masse, a predetermined number of individual, elongate, cylindrical articles, comprising:
    a pair of article-receptive chambers, each having upper and lower open ends;
    a diverter disposed above and movable between first and second positions relative to the upper ends of said chambers for selectively directing articles into one or the other of said chambers;
    means continuously, sequentially introducing articles into said diverter in substantially parallel, axially aligned relationship with one another;
    an upper gate disposed intermediate the upper and lower ends of said chambers, said gate common to both chambers and movable between alternate closed, article-supporting and opened, article-releasing positions therein, wherein the gate is in closed position in one chamber when in opened position in the other chamber, said gate when in closed position in a chamber defining the bottom of an article-receptive upper compartment therein;

a lower gate disposed adjacent the lower ends of said chambers, said gate common to both chambers and movable between alternate closed, article-supporting and opened, article-releasing positions therein, wherein the gate is in closed position in one chamber when in opened position in the other chamber, said gate when in closed position in a chamber defining the bottom of an article-receptive lower compartment therein;

actuator means for each of said gates and said diverter to move them from one to the other of their positions;

a first counter-controlled circuit, responsive to the number of articles introduced into the diverter and thence into the upper compartment of a chamber, to actuate the upper gate actuator means; and a second counter-controlled circuit, responsive to the number of articles introduced into the diverter and thence into the lower compartment of the same chamber, to actuate the lower gate and diverter actuator means.

17. A device as called for in claim 16, wherein the upper and lower gates are initially in closed position in the same chamber, and the diverter is disposed in position for directing articles into said chamber.

18. A device as called for in claim 17, which includes a third counter-controlled circuit, responsive to a predetermined number of articles introduced into the diverter and thence into said chambers, to override the second counter-controlled circuit and actuate the lower gate and diverter actuator means to release all articles then retained in said chambers.

19. A method of accumulating a predetermined total number of similar, elongate articles in parallel, horizontal, axially aligned relationship in an elongate, open ended chamber for release, en masse, into a receptacle, comprising the steps of:

a. subdividing said chamber into an upper and a lower compartment by means movable between article-supporting and article-releasing positions;

b. sequentially introducing articles in parallel, horizontal, axially aligned relationship into the chamber;

c. accumulating a predetermined number of articles less than the said predetermined total number, in the upper compartment of the chamber;

d. releasing the accumulated articles, en masse, from the upper compartment into the lower compartment of the chamber and retaining them therein;

e. accumulating a predetermined number of articles in the lower compartment in addition to the articles retained from the upper compartment, until the said predetermined total number of articles have been accumulated in the lower compartment; and then f. releasing the total number of articles, en masse, from the lower compartment of the chamber into a receptacle.

20. A method as called for in claim 19, wherein a pair of open-ended chambers are provided in side-by-side relationship and include means common to both chambers movable between article-supporting and article-releasing positions to subdivide one or the other of the chambers into upper and lower compartments, which includes the step of:

g. diverting the introduction of articles in step (b) from one chamber to the other chamber each time a predetermined total number of articles are released from a lower compartment in step (f).

21. A method as called for in claim 20, which includes the steps of:

h. moving the subdividing means associated with the upper compartments from article-supporting position in one chamber to article-supporting position in the other chamber each time accumulated articles are released in step (d); and i. moving the subdividing means associated with the lower compartments from article-supporting position in one chamber to article-supporting position in the other chamber each time a predetermined total number of articles are released in step (f).

22. A method as called for in claim 20, whereas step (b) is continuous.

* * * * *